United States Patent [19]

Nomoto

[11] Patent Number: 5,050,546

[45] Date of Patent: * Sep. 24, 1991

[54] VALVE DEVICE

[75] Inventor: Shigeki Nomoto, Musashimurayama, Japan

[73] Assignee: Komatsu Zenoah Company, Tokyo, Japan

[*] Notice: The portion of the term of this patent subsequent to Apr. 16, 2008 has been disclaimed.

[21] Appl. No.: 371,720

[22] Filed: Jun. 27, 1989

[30] Foreign Application Priority Data

Jun. 29, 1988 [JP] Japan .............................. 63-85024[U]

[51] Int. Cl.5 .............................................. F02N 17/08
[52] U.S. Cl. .................................................. 123/182
[58] Field of Search ..................... 123/182; 417/299; 137/614.2, 505.35

[56] References Cited

U.S. PATENT DOCUMENTS

| | | | |
|---|---|---|---|
| 854,035 | 5/1907 | Hansen-Ellehammer | 123/182 |
| 1,254,104 | 1/1918 | Wygodsky | 123/182 |
| 3,335,711 | 8/1967 | Roorda | 123/182 |
| 3,638,632 | 1/1972 | Boling | 123/182 |
| 3,704,988 | 12/1972 | Steele | 123/182 |
| 3,782,354 | 1/1974 | Tuckey | 123/182 |
| 3,888,218 | 6/1975 | Bonewitz | 123/182 |
| 3,893,440 | 7/1975 | Dooley | 123/182 |
| 4,699,096 | 10/1987 | Phillips | 123/182 |

FOREIGN PATENT DOCUMENTS

| | | |
|---|---|---|
| 19567 | 3/1905 | Australia . |
| 188464 | 9/1907 | Fed. Rep. of Germany . |
| 3321938 | 1/1984 | Fed. Rep. of Germany . |

Primary Examiner—Andrew M. Dolinar
Attorney, Agent, or Firm—Weiser & Stapler

[57] ABSTRACT

In order to facilitate start-up of an internal combustion engine, a valve device mounted on a cylinder of the internal combustion engine and enabling a combustion chamber in the cylinder to communicate with the atmospheric air comprises a casing having a first path, an accumulator and a second path, the first path communicating the accumulator to the atmospheric air, the second path communicating the accumulator to the combustion chamber when the valve device is mounted on the cylinder; a valve disposed in the accumulator and associated with the first path; a check valve mechanism disposed between the accumulator and the second path; and a spring biasing the valve in such a direction that the valve does not close between the accumulator and the first path. Further, the valve device comprises a third path communicating the accumulator to the outside thereof.

11 Claims, 2 Drawing Sheets

VALVE DEVICE

BACKGROUND OF THE INVENTION

1. Field of the Invention

The present invention relates to a valve device facilitating start-up of an internal combustion engine by relieving compression pressure in a combustion chamber when the engine is started up.

2. Description of the Background Art

When such an engine is started up with a starter, counterforce against the compression pressure generated by a piston of the engine acts on the starter. Therefore, when a recoil starter is employed, a large amount of force is needed for driving it. Alternatively, when a self-starting motor is employed, it should be a big motor with high power.

SUMMARY OF THE INVENTION

With these problems in mind, therefore, it is an object of the present invention to provide a valve device facilitating start-up of an internal combustion engine.

To achieve the above-mentioned object, there is provided a valve device for an internal combustion engine, the internal combustion engine including a cylinder and a combustion chamber defined in the cylinder, and the valve device being mounted on the cylinder for temporarily communicating the combustion chamber with the atmosphere, the device comprising a casing having a first path, an accumulator and a second path, the first path communicating the accumulator to the combustion chamber of the cylinder and the second path communicating the accumulator to the atmosphere; a first valve for permitting compressed gas generated in the combustion chamber to pass only in a direction from the combustion chamber into the accumulator through the first path; a second valve for closing the second path in response to the pressure of the compressed gas in the accumulator, the second valve being adapted to close the second path to keep the pressure inside the accumulator at a substantially constant level when the pressure of the compressed gas passing from the combustion chamber into the accumulator through the first path reaches a preset value responsive to a sudden increase of the pressure of the compressed gas; and means for biasing the second valve to open the second path when the pressure inside the accumulator falls below the preset value.

Further, a valve device according to the present invention comprises a third path communicating the accumulator to the outside thereof.

In operation of the above-mentioned valve device according to the present invention, when the engine is started up with a starter, the spring biases the second valve not to close between the accumulator and the second path so that generated by the piston (and which is applied to the starter) is relieved (into the atmosphere) through the relieved into the atmosphere air through in turn the first path, the first valve, the accumulator and finally the second path. Therefore, the starter can be driven without any trouble.

When fuel-air mixture in the combustion chamber is ignited, explosion pressure forces the second valve against the spring force of the spring to close between the accumulator and the second path. This closed condition of the valve is held by pressure in the accumulator which accumulates the explosion pressure in cooperation with the first valve, in spite of fluctuation of pressure in the combustion chamber due to reciprocating motion of the engine, so that the engine runs normally.

After the engine stops, the pressure in the accumulator leaks through the third path so that the second valve is forced by the spring to gradually return back to the open condition. As a result, the accumulator again communicates with the atmosphere through the first path.

The above and other objects, features and advantages of the present invention are explained hereinafter and may be better understood by reference to the drawings and the descriptive matter which follows.

DETAILED DESCRIPTION OF THE PREFERRED EMBODIMENTS

Figure 1:
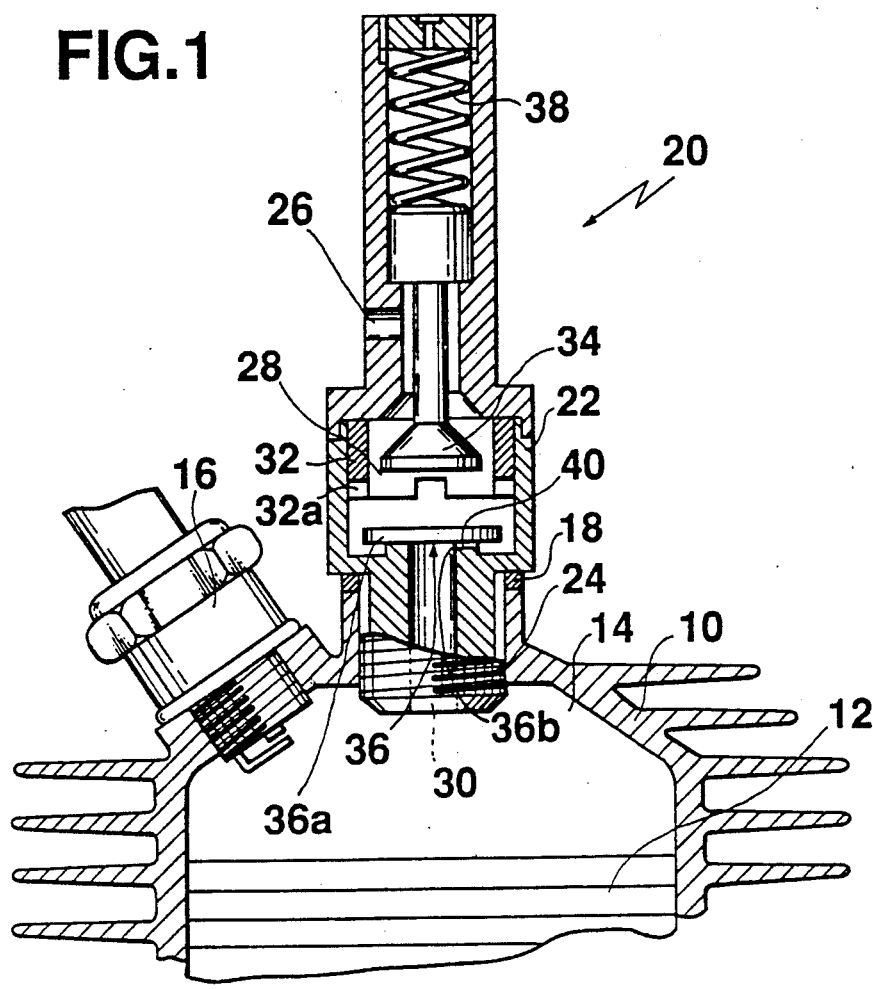
FIG. 1 is a sectional view of a first embodiment of the valve device according to the present invention which is mounted on an engine.
Figure 2:
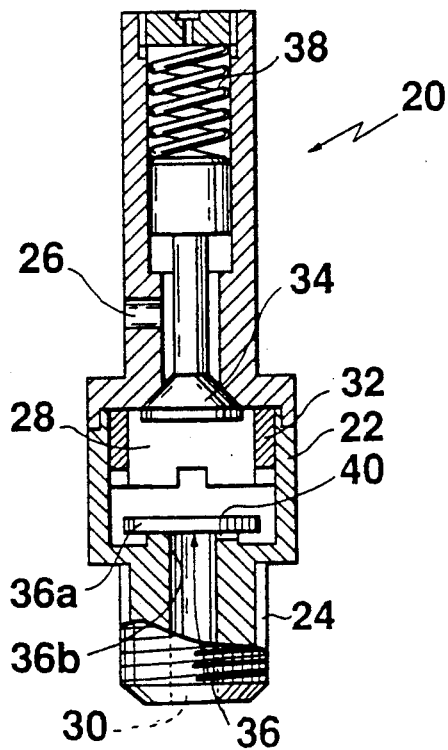
FIG. 2 is a sectional view of the first embodiment of the valve device shown in FIG. 1 which is in another condition.

Referring now to FIGS. 1 and 2, wherein same reference numerals designate identical or corresponding parts, a valve device 20 according to the present invention and a spark plug 16 are screwed and mounted on a wall defining a combustion chamber 14 above a piston 12 in a cylinder 10 of a two-cycle engine. The valve device 20 has a casing 22 which is secured to the top portion of the cylinder 10 (via a washer 18) by engaging a threaded portion 24 formed on the lower portion of the casing 22 with a corresponding threaded portion formed on the cylinder 10.

In the casing 22, a second path 26, an accumulator 28, and a first path 30 are respectively defined such that the accumulator 28 communicates with the atmosphere and the combustion chamber 14 through the second path 26 and the first path 30, respectively. Also, a stop 32 having notches 32a is fitted in the accumulator 28.

In the upper portion of the accumulator 28, a second valve 34 is so disposed as to close the first path 26. On the other hand, in the lower portion of the accumulator 28, a first valve 36a is so disposed as to close the first path 30. This first valve 36a and its seat 36b formed in the accumulator 28 construct a so-called check valve mechanism 36. In this first embodiment, the second and first valves 34 and 36a are conical and planar in shape, respectively.

In the upper portion of the casing 22 above the accumulator 28, a spring 38 is so disposed as to bias the second valve 34 downwardly so that the accumulator 28 normally communicates with the second path 26.

Moreover, a narrow groove 40 is formed in the seat 36b so that the check valve mechanism 36 does not completely close between the accumulator 28 and the first path 30.

With the above arrangement, when the engine is started up with, for example, a recoil starter (not shown), the valve device 20 is in the condition as shown in FIG. 1. Thus, fuel-air mixture compressed by the piston 12 enters the accumulator 28 through the first path 30 and the check valve mechanism 36 and is relieved from there through the second path 26 into the atmosphere, since the second valve 34 is biased not to close between the accumulator 28 and the second path 36 by means of the spring 38. As a result, counterforce against compression pressure in the combustion chamber 14 does not occur and the engine can be run by the recoil starter without any trouble.

When the fuel-air mixture is then ignited by the spark plug 16, explosion pressure enters the accumulator 28 through the first path 30 and the check valve mechanism 36 and urges the second valve 34 upwardly against the spring force of the spring 38 so that the second valve 34 closes between the accumulator 28 and the first path 26. Consequently, the valve device 20 is in the condition as shown in FIG. 2 and the engine automatically starts to run. The second valve 34 is held closed in spite of fluctuation of pressure in the combustion chamber 14 due to reciprocating motion of the piston 12, since the explosion pressure in the accumulator 28 is held by means of the check valve mechanism 36, and the second valve 34 is forced to be closed by the pressure.

When the engine stops, the pressure in the accumulator 28 leaks into the combustion chamber 14 through the groove 40 and drops so that the second valve 34 is biased by the spring 38 to return back to the condition as shown FIG. 1, namely, in which the second valve 34 does not close between the accumulator 28 and the second path 26.

Figure 3:
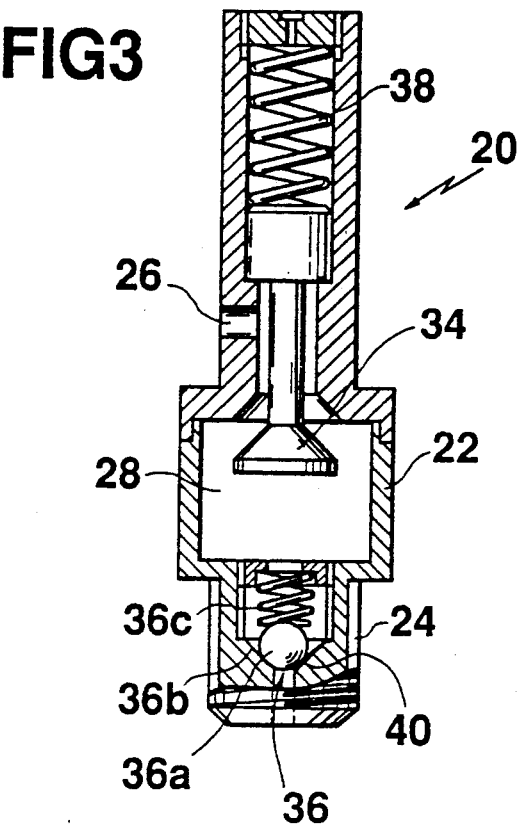
FIG. 3 is a sectional view of a second embodiment of the valve device according to the present invention.

In FIG. 3, there is shown a second embodiment of a valve device according to the present invention, wherein a check valve mechanism 36 comprises a spherical valve 36a, a seat 36b and a spring 36c.

Figure 4:
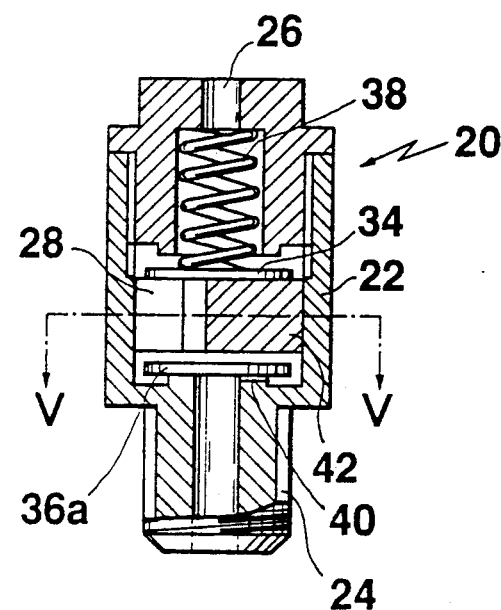
FIG. 4 is a sectional view of a third embodiment of the valve device according to the present invention.
Figure 5:
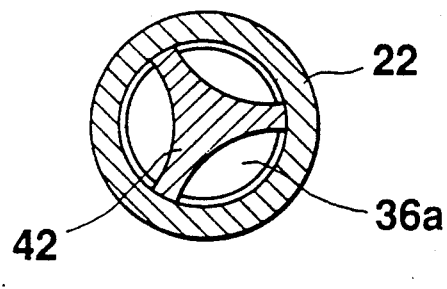
FIG. 5 is a sectional view taken along line V—V of FIG. 4.

In FIGS. 4 and 5, there is shown a third embodiment of a valve device according to the present invention, wherein both valves 34 and 36a are planar, and a radial spacer 42 is fitted in the accumulator 28, instead of a stop 32.

Further, a groove may be formed in the first valve 36a instead of a seat 36b. Also, it may be preferable to form an orifice in a wall of the casing 22 which defines an accumulator 28.

Furthermore, valves 34 and 36a may be either conical, spherical or planar, respectively.

As described above, according to the present invention, when an engine is started up, counterforce does not occur since compression pressure generated by a piston is relieved into the atmosphere. As a result, the engine can smoothly be started up with a starter without any trouble.

Also, in a valve device according to the present invention, explosion pressure is rapidly transmitted to an accumulator through a check valve mechanism, and in spite of fluctuation of pressure in the combustion chamber, pressure in the accumulator can be held at an approximately constant value by means of the check valve mechanism.

Further, in a valve device according to the present invention, pressure in the accumulator is gradually relieved by means of a narrow path.

Having described specific embodiments of the present invention, it is to be understood that variations will occur to those skilled in the art within the scope of the appended claims.

What is claimed is:

1. A valve device for an internal combustion engine, the internal combustion engine including a cylinder and a combustion chamber defined in the cylinder, and the valve device being mounted on the cylinder for temporarily communicating the combustion chamber with the atmosphere, the device comprising:
   a casing having a first path, an accumulator and a second path, the first path communicating the accumulator to the combustion chamber of the cylinder, and the second path communicating the accumulator to the atmosphere;
   a first valve for permitting compressed gas generated in the combustion chamber to pass only in a direction from the combustion chamber into the accumulator through the first path;
   a second valve for closing the second path in response to pressure of the compressed gas in the accumulator, the second valve being adapted to close the second path to keep the pressure inside the accumulator at a substantially constant level when the pressure of the compressed gas passing from the combustion chamber into the accumulator through the first path reaches a preset value responsive to a sudden increase of the pressure of the compressed gas; and
   means for biasing the second valve to open the second path when the pressure inside the accumulator falls below the preset value.

2. The valve device according to claim 1, further comprising a third path for gradually decreasing the increased pressure of the compressed gas in the accumulator to allow the second valve to open the second path.

3. The valve device according to claim 2, wherein the third path is formed in the first valve.

4. The valve device according to claim 2, wherein the third path communicates the accumulator with the combustion chamber to leak the compressed gas in the accumulator out to the combustion chamber when the pressure inside the combustion chamber falls below the preset value.

5. The valve device according to claim 4, wherein the first valve has a valve element, the first path has a valve seat for engaging the valve element of the first valve, and the third path is provided on the valve seat.

6. The valve device according to claim 1, wherein the preset value is substantially the same as the pressure in the combustion chamber when the engine is ignited.

7. The valve device according to claim 6, wherein the preset value is set by biasing force of the biasing means.

8. The valve device according to claim 1, wherein the first valve comprises a planar valve element.

9. The valve device according to claim 1, wherein the first valve comprises a spherical valve element.

10. The valve device according to claim 1, wherein the second valve comprises a conical valve element.

11. The valve device according to claim 1, wherein the accumulator comprises an enlarged, open cavity provided between the first valve and the second valve.

* * * * *